(12) United States Patent
Miyagi et al.

(10) Patent No.: US 11,837,916 B2
(45) Date of Patent: Dec. 5, 2023

(54) ROTOR FOR ROTATING ELECTRIC MACHINE

(71) Applicant: Hitachi Astemo, Ltd., Hitachinaka (JP)

(72) Inventors: Takuya Miyagi, Ibaraki (JP); Toshiki Takahashi, Ibaraki (JP); Hayato Fujita, Ibaraki (JP); Yuichiro Baba, Ibaraki (JP); Kenji Nakayama, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 270 days.

(21) Appl. No.: 17/298,785

(22) PCT Filed: Dec. 13, 2019

(86) PCT No.: PCT/JP2019/048883
§ 371 (c)(1),
(2) Date: Jun. 1, 2021

(87) PCT Pub. No.: WO2020/145033
PCT Pub. Date: Jul. 16, 2020

(65) Prior Publication Data
US 2022/0037940 A1    Feb. 3, 2022

(30) Foreign Application Priority Data

Jan. 8, 2019    (JP) .................................. 2019-001327

(51) Int. Cl.
*H02K 1/22*      (2006.01)
*H02K 7/00*      (2006.01)

(52) U.S. Cl.
CPC .............. *H02K 1/22* (2013.01); *H02K 7/003* (2013.01)

(58) Field of Classification Search
CPC ........... H02K 1/223; H02K 7/003; H02K 1/22
(Continued)

(56) References Cited

U.S. PATENT DOCUMENTS

| | | |
|---|---|---|
| 4,128,780 A | 12/1978 | Sonobe |
| 2014/0225471 A1 | 8/2014 | Kawanami |

(Continued)

FOREIGN PATENT DOCUMENTS

| | | |
|---|---|---|
| JP | S52-39102 A | 3/1977 |
| JP | 2014-158332 A | 8/2014 |

(Continued)

OTHER PUBLICATIONS

European Search Report issued in corresponding Application No. 19909327.9 dated May 30, 2022.

(Continued)

*Primary Examiner* — Terrance L Kenerly
(74) *Attorney, Agent, or Firm* — Foley & Lardner LLP

(57) ABSTRACT

An object of the present invention is to reduce stress caused by press-fitting of a shaft on an outer edge portion side of a rotor. A rotor for a rotating electric machine includes a shaft and a rotor iron core, the shaft coupled to the rotor iron core. The rotor iron core includes: an outer edge portion housing a magnet; an inner edge portion coupled to the shaft; and a rib portion having a lightening portion that is formed inside between the outer edge portion and the inner edge portion. The rib portion includes: a through-hole forming portion connected to the outer edge portion and having a through-hole inside; and a bridge portion connecting the through-hole forming portion and the inner edge portion. The bridge portion includes: a second bridge portion connected to the through-hole forming portion and protruding outward; and a first bridge portion having one end connected to the inner edge portion and another end connected to the second bridge portion. A bent portion is provided at a position connecting the first bridge portion and the second bridge portion.

4 Claims, 4 Drawing Sheets

(58) Field of Classification Search
USPC ......... 310/216.001, 156.56, 156.53, 216.103
See application file for complete search history.

(56) References Cited

U.S. PATENT DOCUMENTS

| | | |
|---|---|---|
| 2014/0232232 A1 | 8/2014 | Yamaguchi et al. |
| 2016/0233733 A1* | 8/2016 | Biffard .................... H02K 1/30 |
| 2017/0302116 A1* | 10/2017 | Oshida .................... H02K 1/30 |
| 2018/0367004 A1 | 12/2018 | Xu et al. |

FOREIGN PATENT DOCUMENTS

| | | |
|---|---|---|
| JP | 2017-93059 A | 5/2017 |
| WO | WO-2016/047311 A1 | 3/2016 |

OTHER PUBLICATIONS

International Search Report with English translation and Written Opinion issued in corresponding application No. PCT/JP2019/048883 dated Mar. 17, 2020.

* cited by examiner

ROTOR FOR ROTATING ELECTRIC MACHINE

TECHNICAL FIELD

The present invention relates to a rotor for a rotating electric machine.

BACKGROUND ART

In rotors for rotating electric machines, there is known a rotor in which a shaft press-fitting hole is provided in a rotor iron core, and a shaft is coupled to the rotor iron core by press-fitting the shaft (see, for example, PTL 1).

The rotor of PTL 1 includes the rotor iron core and the shaft, and the rotor iron core is made of a stack of a plurality of electromagnetic steel sheets. The shaft press-fitting hole is provided in an inner area of the rotor iron core, and the shaft is press-fitted thereto. An outer area of the rotor iron core houses a magnet. Rib portions connecting the inner area and the outer area are provided, and the inner rib portions are distributed to reduce the concentration of stress on the inner area side due to the press-fitting of the shaft into the shaft press-fitting hole.

CITATION LIST

Patent Literature

PTL 1: WO 2016/047311 A

SUMMARY OF INVENTION

Technical Problem

There is a demand for weight reduction in the rotating electric machine. When a lightening hole of the rotor iron core is expanded to reduce the weight, stress on the inner circumference of the rotor iron core increases. The stress caused by the press-fitting of the shaft is transmitted from the inner area side to the outer area side, and the stress is concentrated on the outer area side in which the magnet is housed. There is a case where magnetic characteristics of the rotating electric machine are affected by the stress concentrated on the outer area side in which the magnet is housed.

Therefore, the present invention has been made in view of the above problems, and an object thereof is to reduce stress caused by press-fitting of a shaft on an outer edge portion side of a rotor.

Solution to Problem

The present invention relates to a rotor for a rotating electric machine including a shaft and a rotor iron core, the shaft coupled to the rotor iron core. The rotor iron core includes: an outer edge portion housing a magnet; an inner edge portion coupled to the shaft; and a rib portion having a lightening portion that is formed inside between the outer edge portion and the inner edge portion. The rib portion includes: a through-hole forming portion connected to the outer edge portion and having a through-hole inside; and a bridge portion connecting the through-hole forming portion and the inner edge portion. The bridge portion includes: a second bridge portion connected to the through-hole forming portion and protruding outward; and a first bridge portion having one end connected to the inner edge portion and another end connected to the second bridge portion. A bent portion is provided at a position connecting the first bridge portion and the second bridge portion.

Advantageous Effects of Invention

Therefore, in the present invention, stress applied to the inner edge portion due to press-fitting of the shaft compresses the rib portion connecting the inner edge portion and the outer edge portion and suppresses an axial deformation of the rib portion from, and it is possible to reduce the influence on magnetic characteristics of a rotating electric machine and reduce the stress at the outer edge portion.

Details of at least one embodiment of a subject matter disclosed in the present specification are set forth in the accompanying drawings and the following description. Other features, aspects, and effects of the disclosed subject matter will be apparent from the following disclosure, drawings, and claims.

DESCRIPTION OF EMBODIMENTS

Hereinafter, embodiments of the present invention will be described with reference to the accompanying drawings.

First Embodiment

Figure 1:
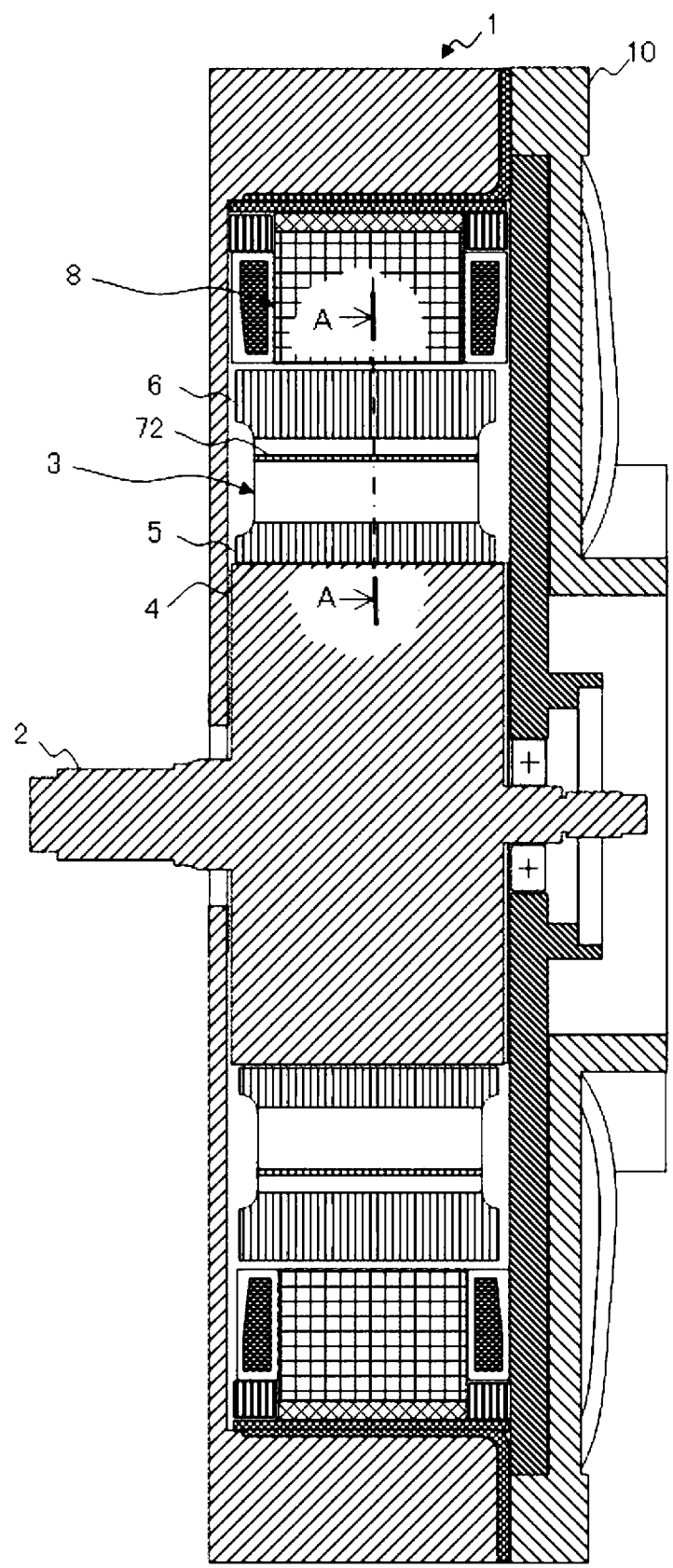
FIG. 1 illustrates a first embodiment of the present invention and is a cross-sectional view in an axial direction of a rotating electric machine.

FIG. 1 illustrates a first embodiment of the present invention and is a cross-sectional view in an axial direction of a rotating electric machine. A rotating electric machine 1 includes a stator 20 arranged on the inner circumference of a housing 10 and a rotor. The rotor includes a shaft 2 pivotally supported by the housing 10 and a rotor iron core 3 coupled to the outer circumference of the shaft 2. The rotor iron core 3 is formed by stacking a plurality of electromagnetic steel sheets.

Figure 2:
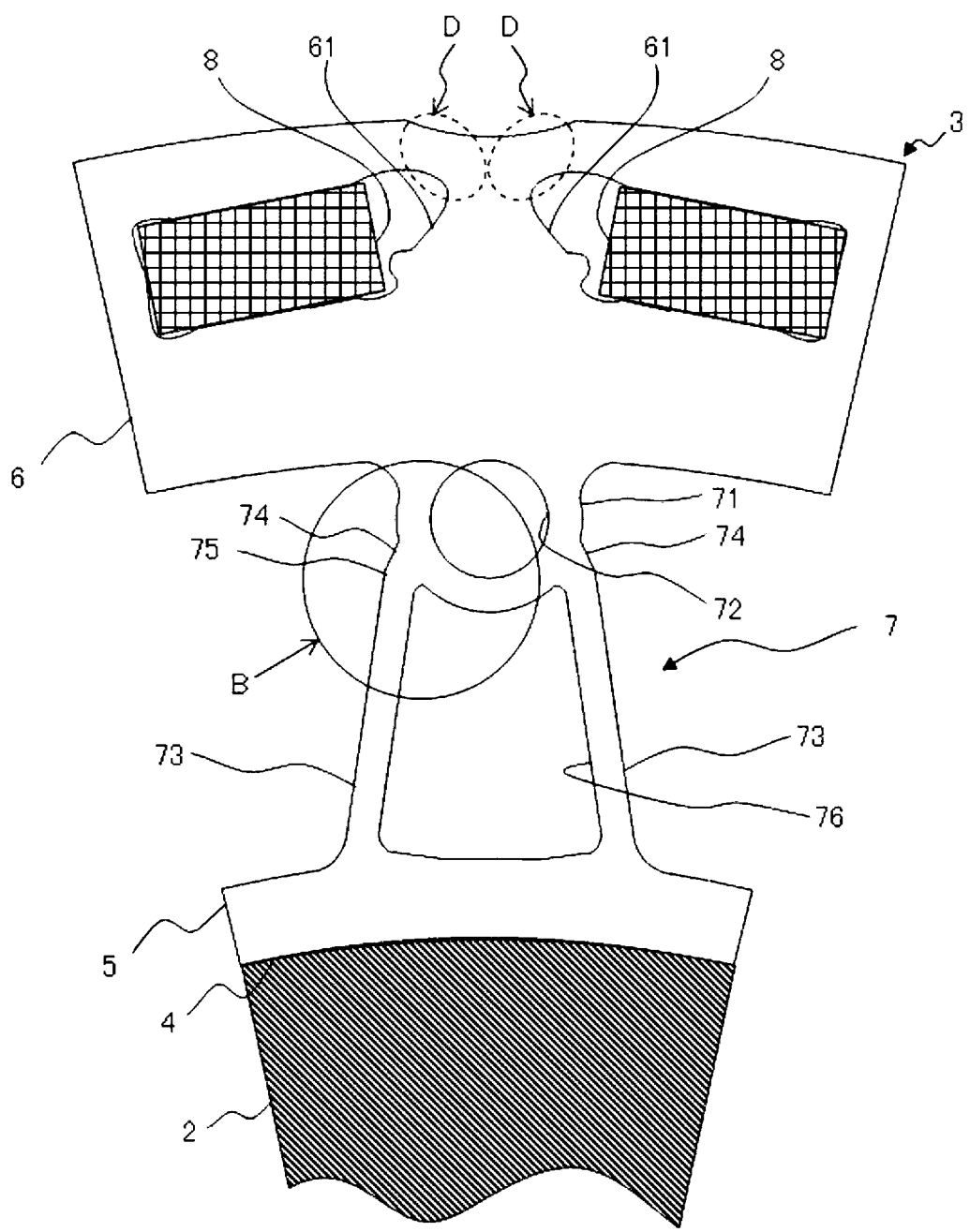
FIG. 2 illustrates the first embodiment of the present invention, and is a cross-sectional view taken along line A-A of FIG. 1, which is a cross-sectional view of a rotor.

FIG. 2 is a cross-sectional view taken along line A-A of FIG. 1. A shaft press-fitting hole 4 is formed at the center of the rotor iron core 3, and the shaft 2 is press-fitted thereto. The rotor iron core 3 is formed with an inner edge portion 5 covering the shaft press-fitting hole 4, a rib portion 7 covering the inner edge portion 5, and an outer edge portion 6 covering the rib portion 7, and the inner edge portion 5 and the outer edge portion 6 are connected by the rib portion 7.

The rib portion 7 is arranged along a radial direction of the rotor iron core 3. Bridge portion (first bridge portions) 73 are formed on the inner edge portion 5 side of the rib portion 7. Bridge portions (second bridge portions) 74 and a through-hole forming portion 71 are formed between the bridge portions 73 and the outer edge portion 6 via a bent portion 75. A through-hole 72 is formed inside the through-hole forming portion 71.

The bridge portions 73 and 74 are formed from the lower outer circumference of the through-hole forming portion 71 toward the inner edge portion 5 as a pair of wall portions, and a space defined by the left and right bridge portions 73 and 73, the left and right bridge portions 74 and 74, the through-hole forming portion 71, and the inner edge portion 5 serves as a lightening portion 76.

On the outer circumference side of the outer edge portion 6, a magnet accommodating portion 61 is formed as a through-hole for housing a magnet 8, and the magnet 8 is housed therein.

Figure 3:
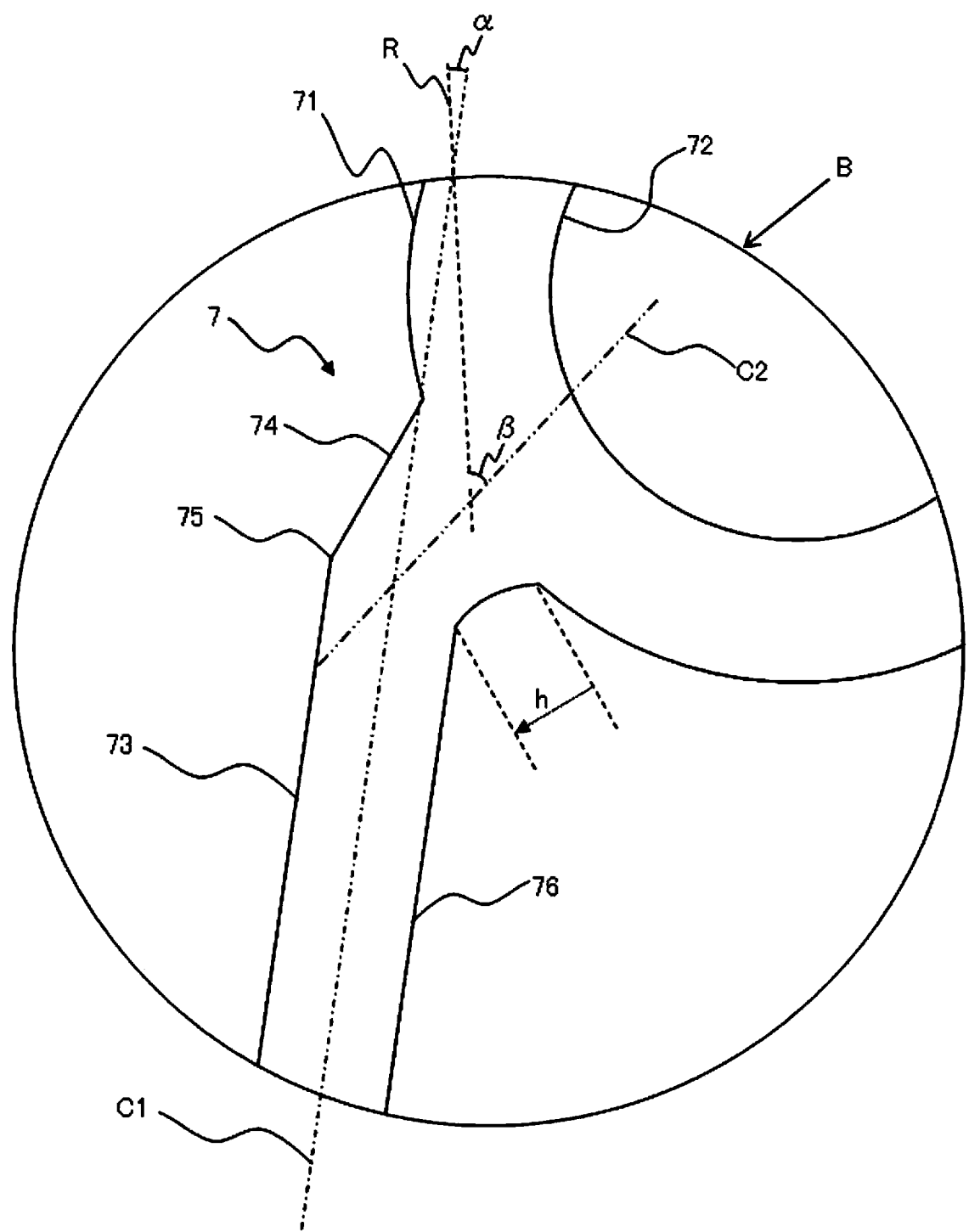
FIG. 3 illustrates the first embodiment of the present invention and is a view of a part indicated by arrow B in FIG. 2.

FIG. 3 is a view of a part indicated by arrow B of FIG. 2, which illustrates details of the rib portion 7. The rib portion 7 connecting the inner edge portion 5 and the outer edge portion 6 is formed with the bridge portion (first bridge portion) 73 rising from the inner edge portion 5 side to the through-hole forming portion 71 and the bridge portion (second bridge portion) 74 protruding outward from the through-hole forming portion 71. In the illustrated example, the lightening portion 76 side of the bridge portion 74 protrudes to the outside of the through-hole forming portion 71 by a height h.

Then, the bent portion 75 protruding outward from the internal lightening portion 76 is formed at a position where the bridge portion 73 and the bridge portion 74 are connected. That is, a center line C1 of the bridge portion 73 and a center line C2 of the bridge portion 74 are set at different angles and intersect with each other inside the bent portion 75.

Here, the center line C1 and an extension line of the bridge portion 73 extend from the inner edge portion 5 side to the outer edge portion 6, and an extension line of the center line C1 is arranged outside the through-hole 72. On the other hand, an extension line of the center line C2 of the bridge portion 74 is set inside the through-hole 72.

The relationship between an angle α formed by the center line C1 of the bridge portion 73 and a radius R of the rotor iron core 3 and an angle β formed by the center line C2 of the bridge portion 74 and the radius R of the rotor iron core 3 is expressed by $\alpha < \beta$.

When the shaft 2 is press-fitted to the shaft press-fitting hole 4, stress is applied to the inner edge portion 5 from the inner circumference to the outer circumference. This stress is transmitted from the bridge portion 73 to the outer edge portion 6 via the bridge portion 74 and the through-hole forming portion 71.

The inner edge portion 5 is displaced due to stress caused by the fitting between the shaft 2 and the shaft press-fitting hole 4 to compress the rib portion 7. The center line C1 of the bridge portion 73 rising from the outer circumference of the inner edge portion 5 and the center line C2 of the bridge portion 74 protruding from the through-hole forming portion 71 intersect with the rib portion 7 at the bent portion 75, and the compressed rib portion 7 is deformed as a whole of the bridge portions 73 and 74 including the bent portion 75.

This deformation can distribute the stress, generated in the inner edge portion 5, to the rib portion 7 and the outer edge portion 6, and thus, stress at a part D in FIG. 2 can be reduced in the outer edge portion 6.

Further, the rib portion 7 is deformed in the axial direction of the shaft 2 by the compression, but the axial deformation is suppressed by the deformation of the bent portion 75 and the bridge portions 73 and 74. As a result, the influence on magnetic characteristics of the rotating electric machine can be reduced.

On the other hand, when the bent portion 75 or the like is not provided in the rib portion 7 as in the above-described conventional example, most of stress generated in the inner edge portion 5 is transmitted to the outer edge portion 6, and thus, the stress is concentrated in the part D of the outer edge portion 6.

On the other hand, in the rib portion 7 of the first embodiment, the bent portion 75 protruding to the inner side of the outer edge portion 6 is provided between the bridge portion 73 and the bridge portion 74, and the extension line of the center line C1 of the bridge portion 73 is set to pass outside the through-hole 72, so that the stress applied to the part D in FIG. 2 can be reduced.

The inventors have confirmed that the stress applied to the part D in FIG. 2 due to the press-fitting of the shaft 2 is reduced by about 4% by connecting the bridge portion 74 protruding from the through-hole forming portion 71 and the bridge portion 73 rising from the inner edge portion 5 via the bent portion 75 as in the first embodiment.

Second Embodiment

Figure 4:
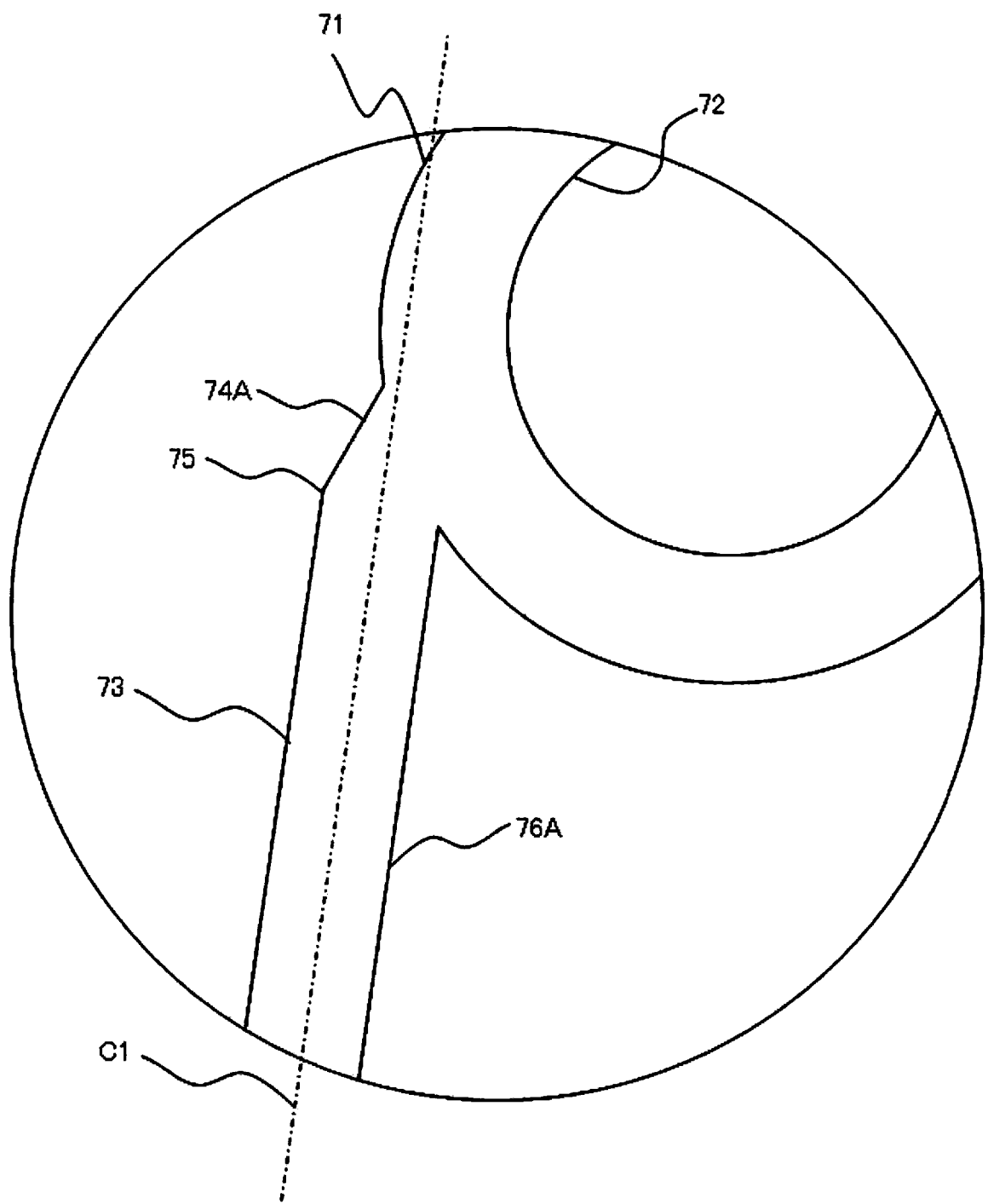
FIG. 4 illustrates a second embodiment of the present invention, and is a view of the part indicated by arrow B in FIG. 2.

FIG. 4 illustrates a second embodiment, and is a view of the rotor iron core 3 in which a shoulder portion 74A and the bent portion 75 are provided on the through-hole forming portion 71 side of the bridge portion (first bridge portion) 73, instead of the bridge portion (second bridge portion) 74 of the first embodiment. Other configurations are the same as those in the first embodiment.

The rib portion 7 of the second embodiment connects the inner edge portion 5 and the through-hole forming portion 71 at the bridge portion 73. Then, the bent portion 75 protruding to the outer edge portion 6 side is formed in the bridge portion 73 connected to the through-hole forming portion 71 side. Further, the bent portion 75 is connected to the through-hole forming portion 71 via the shoulder portion 74A. An inclination angle of the shoulder portion 74A is set to an angle different from an inclination angle of the bridge portion 73 on the inner edge portion 5 side.

The bridge portion 73 is arranged such that an extension line of the center line C1 of the bridge portion 73 is located on the outer circumference side of the through-hole 72 similarly to the first embodiment.

When the inner edge portion 5 is displaced due to the fitting between the shaft 2 and the shaft press-fitting hole 4, the rib portion 7 is compressed. The bridge portion 73 rising from the inner edge portion 5 is deformed as a whole of the bridge portion 73 and the shoulder portion 74A by the bent portion 75 provided between the bridge portion 73 and the shoulder portion 74A connected to the through-hole forming portion 71.

Since the bridge portion 73 is deformed almost at the entire portion, stress generated in the inner edge portion 5 can be distributed to the rib portion 7 and the outer edge portion 6, and thus, the stress at the outer edge portion 6 illustrated in the part D in FIG. 2 can be reduced similarly to the first embodiment.

SUMMARY

As described above, the rotor for the rotating electric machine according to the first embodiment is a rotor for a rotating electric machine including a shaft (2) and a rotor iron core (3), the shaft press-fitted to the rotor iron core. The rotor iron core (3) includes: an outer edge portion (6) housing a magnet (8); an inner edge portion (5) coupled to the shaft (2); and a rib portion (7) having a lightening portion (76) that is formed inside between the outer edge portion (6) and the inner edge portion (5). The rib portion (7) includes:

a through-hole forming portion (71) connected to the outer edge portion (6) and having a through-hole (72) inside; and a bridge portion (73, 74) connecting the through-hole forming portion (71) and the inner edge portion (5). The bridge portion includes: a second bridge portion (74) connected to the through-hole forming portion (71) and protruding toward the outer edge portion (6); and a first bridge portion (73) having one end connected to the inner edge portion (5) and another end connected to the second bridge portion (74). A bent portion (75) is provided at a position connecting the first bridge portion (73) and the second bridge portion (74).

With the above configuration, the inner edge portion 5 is displaced to compress the rib portion 7 when the shaft 2 is press-fitted to the shaft press-fitting hole 4. Since the center line C1 of the bridge portion 73 rising from the inner edge portion 5 and the center line C2 of the bridge portion 74 protruding from the through-hole forming portion 71 intersect with the rib portion 7 at the bent portion 75, the compressed rib portion 7 is deformed as a whole of the bridge portions 73 and 74 including the bent portion 75.

This deformation can distribute the stress, generated in the inner edge portion 5, to the rib portion 7 and the outer edge portion 6, and thus, the stress at the part D illustrated in FIG. 2 can be reduced in the outer edge portion 6.

Further, an extension of the center line of the first bridge portion (73) is located outside the through-hole (72). As a result, the rib portion 7 compressed from the inner edge portion 5 is deformed as a whole of the first bridge portion (73) and the second bridge portion (74) connected by the bent portion 75, so that the stress applied to the rib portion 7 can be distributed to the outer edge portion 6 and the rib portion 7.

Further, the rotor iron core (3) of the second embodiment includes: the outer edge portion (6) housing the magnet; the inner edge portion (5) coupled to the shaft (2); and the rib portion (7) in which a lightening portion is formed inside between the outer edge portion (6) and the inner edge portion (5). The rib portion (7) includes: the through-hole forming portion (71) connected to the outer edge portion (6) and having the through-hole (72) inside; and the bridge portion (73) connecting the through-hole forming portion (71) and the inner edge portion (5). The bridge portion (73) includes: the shoulder portion (74A) formed in an end portion on the through-hole forming portion (71) side and protruding toward the outer edge portion (6); and the bent portion (75) formed between the shoulder portion (74A) and an end portion on the inner edge portion (5) side.

With the above configuration, the inner edge portion 5 is displaced to compress the rib portion 7 when the shaft 2 is press-fitted to the shaft press-fitting hole 4. The bridge portion 73 rising from the inner edge portion 5 and the shoulder portion (74A) are connected by the bent portion 75, and the compressed rib portion 7 is deformed at the entire bridge portion 73 including the bent portion 75. This deformation can distribute the stress, generated in the inner edge portion 5, to the rib portion 7 and the outer edge portion 6, and thus, the stress can be reduced in the outer edge portion 6 centered on the part D illustrated in FIG. 2.

Incidentally, the present invention is not limited to the above-described embodiments, but includes various modifications. For example, the above-described embodiments have been described in detail in order to describe the present invention in an easily understandable manner, and are not necessarily limited to those including the entire configuration that has been described above. Further, some configurations of a certain embodiment can be substituted by configurations of another embodiment, and further, a configuration of another embodiment can be also added to a configuration of a certain embodiment. Further, addition, deletion, or replacement of other configurations can be applied alone or in combination for a part of the configuration of each embodiment.

REFERENCE SIGNS LIST 2 shaft
3 rotor
4 shaft
5 inner edge portion
6 outer edge portion
7 rib portion
8 magnet
71 through-hole forming portion
72 through-hole
73 bridge portion
74 bridge portion
75 bent portion
76 lightening portion

The invention claimed is:

1. A rotor for a rotating electric machine comprising:
a shaft; and
a rotor iron core,
wherein
the shaft is coupled to the rotor iron core,
the rotor iron core includes: an outer edge portion housing a magnet; an inner edge portion coupled to the shaft; and a rib portion having a lightening portion that is formed inside between the outer edge portion and the inner edge portion,
the rib portion includes: a through-hole forming portion connected to the outer edge portion and having a through-hole inside; and a bridge portion connecting the through-hole forming portion and the inner edge portion,
the bridge portion includes: a second bridge portion protruding outward from a lower outer circumference of the through-hole forming portion; and a first bridge portion having one end connected to the inner edge portion and another end connected to the second bridge portion, and
a bent portion is provided at a position connecting the first bridge portion and the second bridge portion.

2. The rotor for the rotating electric machine according to claim 1, wherein an extension of a center line of the bridge portion is located outside the through-hole.

3. A rotor for a rotating electric machine comprising:
a shaft; and
a rotor iron core,
wherein
the shaft is coupled to the rotor iron core,
the rotor iron core includes: an outer edge portion housing a magnet; an inner edge portion coupled to the shaft; and a rib portion having a lightening portion that is formed inside between the outer edge portion and the inner edge portion,
the rib portion includes: a through-hole forming portion connected to the outer edge portion and having a through-hole inside; and a bridge portion connecting the through-hole forming portion and the inner edge portion, and
the bridge portion includes: a bent portion formed on an end portion side connected to a lower outer circumference of the through-hole forming portion and protruding toward the outer edge portion; and a shoulder portion connecting the bent portion and the through-hole forming portion.

4. The rotor for the rotating electric machine according to claim 3, wherein an extension of a center line of the bridge portion is located outside the through-hole.

* * * * *